United States Patent
Oikawa et al.

(10) Patent No.: US 9,491,325 B2
(45) Date of Patent: Nov. 8, 2016

(54) IMAGE PROCESSING APPARATUS, IMAGE PROCESSING METHOD FOR THE SAME, AND RECORDING MEDIUM

(71) Applicant: KONICA MINOLTA, INC., Chiyoda-ku, Tokyo (JP)

(72) Inventors: Takashi Oikawa, Toyohashi (JP); Tomoyuki Atsumi, Toyohashi (JP); Takanobu Sugiyama, Toyokawa (JP); Tatsuya Kitaguchi, Toyokawa (JP); Satoshi Osako, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/842,861

(22) Filed: Sep. 2, 2015

(65) Prior Publication Data
US 2016/0065777 A1  Mar. 3, 2016

(30) Foreign Application Priority Data
Sep. 3, 2014 (JP) .................. 2014-179622

(51) Int. Cl.
*G06K 15/00* (2006.01)
*H04N 1/00* (2006.01)
*H04N 1/21* (2006.01)
*G06F 3/12* (2006.01)

(52) U.S. Cl.
CPC ........ *H04N 1/00954* (2013.01); *H04N 1/0096* (2013.01); *H04N 1/00411* (2013.01); *H04N 1/00474* (2013.01); *H04N 1/00925* (2013.01); *H04N 1/2166* (2013.01); *H04N 2201/0094* (2013.01); *H04N 2201/214* (2013.01); *H04N 2201/3222* (2013.01); *H04N 2201/3242* (2013.01); *H04N 2201/3287* (2013.01); *H04N 2201/3294* (2013.01); *H04N 2201/3298* (2013.01)

(58) Field of Classification Search
None
See application file for complete search history.

(56) References Cited

U.S. PATENT DOCUMENTS 5,745,663 A * 4/1998 Takagi ................ G06F 13/4269
   358/1.15
2007/0121161 A1* 5/2007 Yamada ............. H04N 1/00954
   358/1.16

FOREIGN PATENT DOCUMENTS

JP       2013-098723 A   5/2013

* cited by examiner

*Primary Examiner* — Dov Popovici
(74) *Attorney, Agent, or Firm* — Buchanan Ingersoll & Rooney PC

(57) ABSTRACT

An image processing apparatus having functions installed thereon includes a job input portion that inputs a first job, a job storage that stores the first job, a job output portion that outputs the first job, a memory that allows allocating memory areas to the functions and reallocating the memory areas, a first judgment portion that judges whether or not the memory areas were reallocated after input but before output of the first job, a second judgment portion that judges whether or not output of the first job requires any unavailable function, a third judgment portion that judges whether or not the unavailable function will be available by restricting operations related to a second job and by adjusting the memory areas, and an operation restriction portion restricts operations related to the second job and adjusts the memory areas, wherein the first job is output while restrictions on the operations are effective.

17 Claims, 9 Drawing Sheets

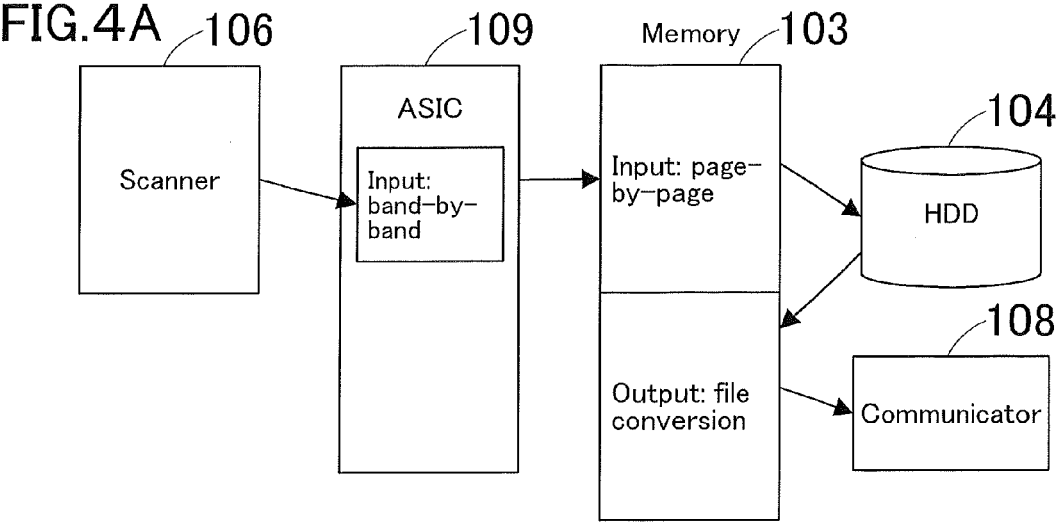
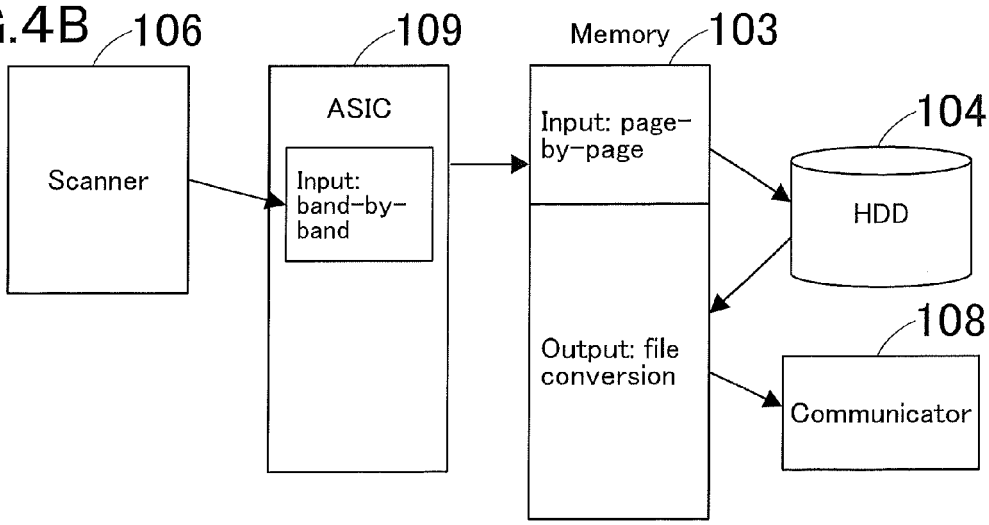
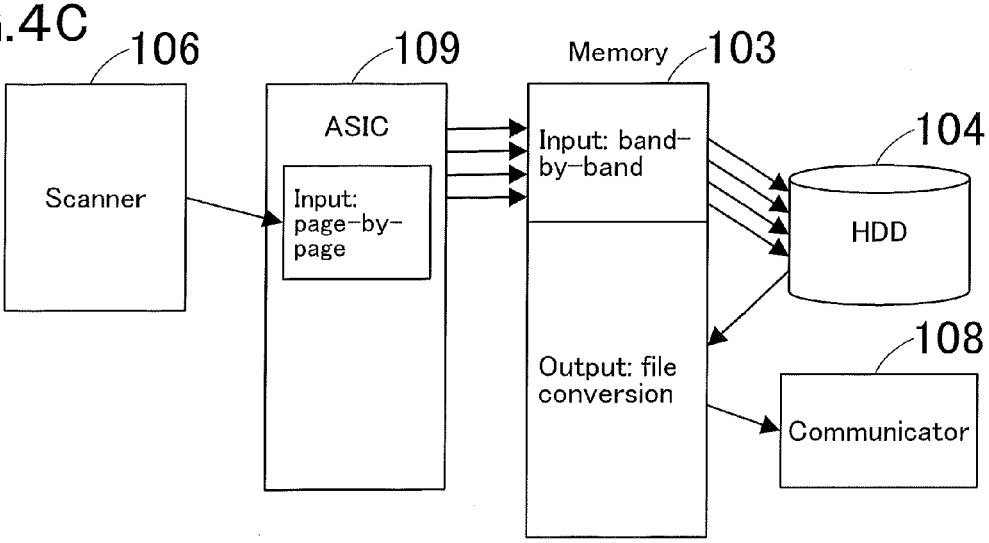

Function Availability Table

| | Document Scan Resolution | Document Size | Output Size | Output Resolution | File Format | Banner Print | Image Consolidation |
|---|---|---|---|---|---|---|---|
| 1GB | 300dpi | A3 | A3 | 600dpi | Unacceptable: DOCX, XLSX | Unavailable | Unavailable |
| 2GB | 600dpi | A3 | A3 | 1200dpi | No restriction | Unavailable | Date only |
| 3GB | 600dpi | SRA3 | SRA3 | 1200dpi | No restriction | Available | No restriction |

FIG.7

Operation Restriction Table

| | Document Scan Resolution | Document Size | Output Size | Output Resolution | File Format | Banner Print | Image Consolidation |
|---|---|---|---|---|---|---|---|
| 1GB | ○600dpi →Prohibit operations related to other jobs | ○SRA3 → Data compression ratio of 2 to 1 or less; A4 size or smaller; 20 or less pages | A3 →Unacceptable: SRA3 | 600dpi →Unacceptable: 1200 dpi | ○No restriction →Prohibit operations related to other jobs | ×Unavailable | ○No restriction →Restricted number of other jobs: 1 |
| 2GB | 600dpi | ○SRA3 → A4 size or smaller; 40 or less pages | A3 →Unacceptable: SRA3 | 1200dpi | No restriction | ×Unavailable | ○No restriction →Restricted number of other jobs: 1 |

IMAGE PROCESSING APPARATUS, IMAGE PROCESSING METHOD FOR THE SAME, AND RECORDING MEDIUM

This application claims priority under 35 U.S.C. §119 to Japanese Patent Application No. 2014-179622 filed on Sep. 3, 2014, the entire disclosure of which is incorporated herein by reference in its entirety.

BACKGROUND OF THE INVENTION

1. Field of the Invention

The present invention relates to an image processing apparatus such as a multi-function peripheral (MFP), i.e., a multifunctional digital image forming apparatus; an image processing method for the image processing apparatus; and a recording medium.

2. Description of the Related Art

The following description sets forth the inventor's knowledge of related art and problems therein and should not be construed as an admission of knowledge in the prior art.

An image processing apparatus as described above has a plurality of functions. It is allowed to store a job that is input by one of the functions on its storage device and is also allowed to read it out of the storage device and execute processing (output the job) by one of the functions. The CPU implements these functions with use of a memory.

The memory to be used for these functions has memory areas allocated to the respective functions; the image processing apparatus executes jobs with use of the memory areas.

The image processing apparatus has one or more standard functions to be available upon being started; one or more optional add-on functions can be installed on the image processing apparatus according to the needs of users.

Upon an optional function being installed, a part of the memory areas allocated to the standard functions is diverted to the optional function, causing a reduction in the size of the memory area allocated to the standard functions. This configuration has problems as described below.

That is, an optional function may be installed after job input but before job output. As described above, upon an optional function being installed, a part of the memory areas allocated to the standard functions is diverted to the optional function, causing a reduction in the size of the memory areas allocated to the standard functions. Some of the standard functions, which were available at the time of job input, can be unavailable and job output hardly can be executed, because of insufficient memory area.

Furthermore, the job is kept stored on the storage device without being output, causing a waste of the limited memory resources on the storage device.

Job output may be executed by an alternative function to an unavailable function; the alternative function, however, does not always work as intended by the user at the time of job input. For example, when the user gives an instruction for high resolution output, job output can be executed with a low resolution by an alternative function. This is not user-friendly.

Japanese Unexamined Patent Publication No. 2013-098723 suggests an image forming system in order to ensure the conditions for operators to tightly control data to be printed and in order to prevent job errors caused by lack of free memory during private printing. The image forming system is provided with a display controller that makes a display 315 of a personal computer to display a message requesting to give a restriction release instruction when a private print instruction accepting portion accepts a private print instruction, and a communicator that transmits an operation restriction instruction for implementing private printing to a multifunctional machine, along with the conditions to release restrictions.

The technique described in Japanese Unexamined Patent Publication No. 2013-098723, however, does not bring a perfect solution to the above-described problems which occur when memory areas are reallocated after job input but before job output.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing apparatus having functions installed thereon, the image processing apparatus including:

a job input portion that inputs a first job;

a job storage that stores the first job input by the job input portion;

a job output portion that outputs the first job stored on the job storage;

a memory that allows allocating memory areas to the functions installed on the image processing apparatus and reallocating the memory areas;

a first judgment portion that judges whether or not the memory areas were reallocated after the job input portion inputs the first job but before the job output portion outputs the first job stored on the job storage;

a second judgment portion that judges whether or not output of the first job requires any unavailable function, after the first judgment portion judges that the memory areas were reallocated after input of the first job but before output of the first job;

a third judgment portion that judges whether or not the unavailable function will be available by restricting operations related to a second job and by adjusting the memory areas, after the second judgment portion judges that output of the first job requires any unavailable function; and an operation restriction portion restricts operations related to the second job and adjusts the memory areas, after the third judgment portion judges that the unavailable function will be available by restricting operations related to the second job and by adjusting the memory areas, wherein the job output portion outputs the first job while the operation restriction portion keeps restrictions on the operations related to the second job.

A second aspect of the present invention relates to an image processing method to be implemented by an image processing apparatus having functions installed thereon, the image processing method including:

inputting a first job;

storing the first job on a job storage, the first job being input;

outputting the first job stored on the job storage;

allocating memory areas to the functions installed on the image processing apparatus and reallocating the memory areas;

judging whether or not the memory areas were reallocated after input of the first job but before output of the first job stored on the job storage;

judging whether or not output of the first job requires any unavailable function, after it is judged that the memory areas were reallocated after input of the first job but before output of the first job;

judging whether or not the unavailable function will be available by restricting operations related to a second job and by adjusting the memory areas, after it is judged that output of the first job requires any unavailable function; and restricting operations related to the second job and adjusting the memory areas, after it is judged that the unavailable function will be available by restricting operations related to the second job and by adjusting the memory areas, wherein the first job is output while restrictions on the operations related to the second job are effective.

A third aspect of the present invention relates to a non-transitory computer-readable recording medium storing an image processing program for a computer of an image processing apparatus having functions installed thereon, the image processing program to make the computer execute:

inputting a first job;

storing the first job on a job storage, the first job being input;

outputting the first job stored on the job storage;

allocating memory areas to the functions installed on the image processing apparatus and reallocating the memory areas;

judging whether or not the memory areas were reallocated after input of the first job but before output of the first job stored on the job storage;

judging whether or not output of the first job requires any unavailable function, after it is judged that the memory areas were reallocated after input of the first job but before output of the first job;

judging whether or not the unavailable function will be available by restricting operations related to a second job and by adjusting the memory areas, after it is judged that output of the first job requires any unavailable function; and restricting the operations related to the second job and adjusting the memory areas, after it is judged that the unavailable function will be available by restricting operations related to the second job and by adjusting the memory areas, wherein the first job is output while restrictions on the operations related to the second job are effective.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIGS. 4A to 4C are views to explain where image data goes when a document is scanned by a scanner, when the obtained image data is converted to a particular file format, and when it is output; FIG. 4A is a view to explain the case when the image processing apparatus is in normal operation; FIG. 4B is a view to explain the case when a part of the memory area for image data loading is diverted to file conversion; FIG. 4C is a view to explain the case when image data is loaded into the memory in a different method;

FIG. 7 illustrates a function availability table;

FIG. 8 illustrates an operation restriction table;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
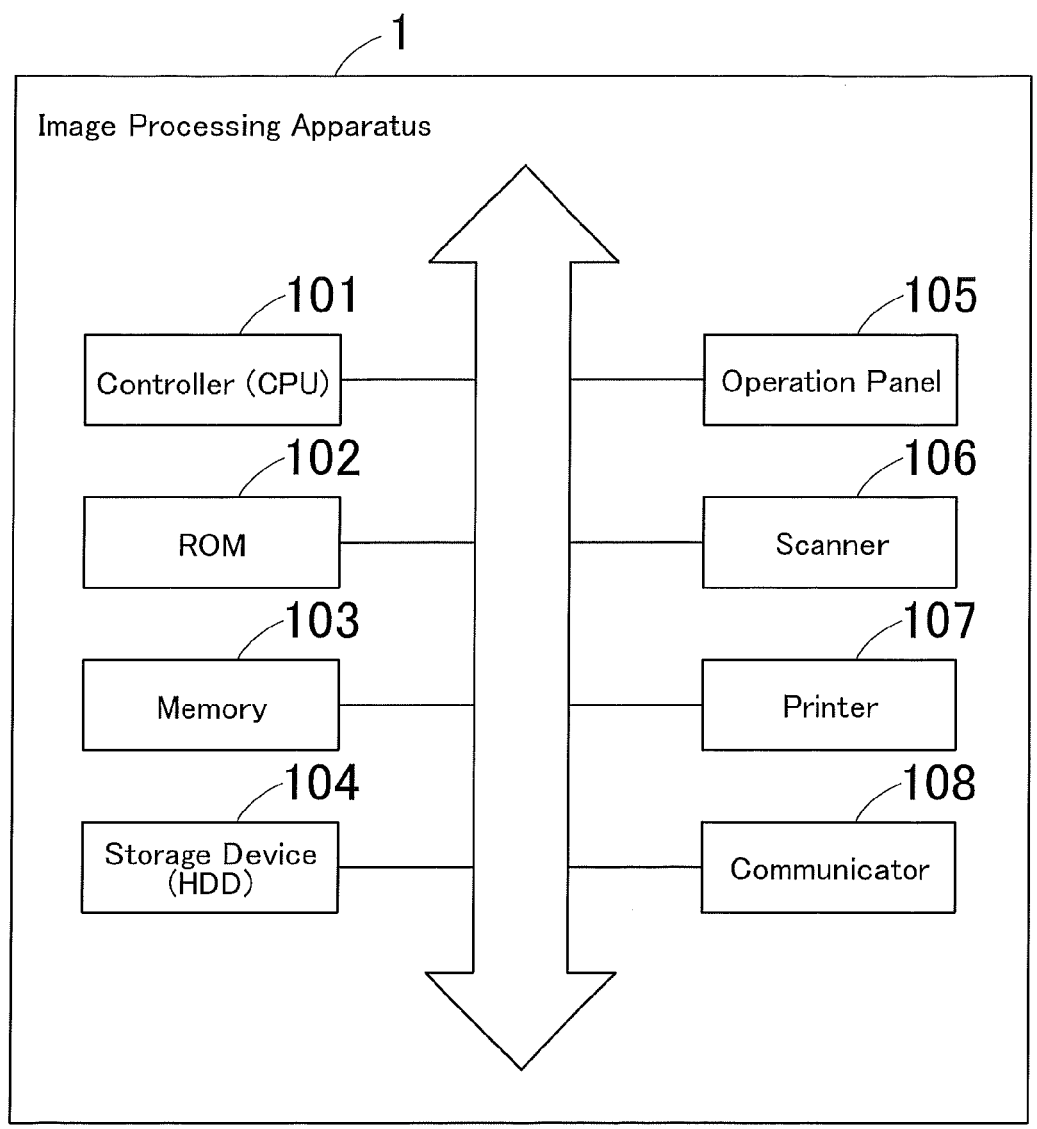
FIG. 1 is a block diagram illustrating a basic configuration of an image processing apparatus according to one embodiment of the present invention.

FIG. 1 is a block diagram illustrating a basic configuration of an image processing apparatus 1 according to one embodiment of the present invention. In this embodiment, a MFP, i.e., a multifunctional digital image forming apparatus having various functions such as copier function, printer function, and scanner function, as described above, is employed as the image processing apparatus 1.

The image processing apparatus 1 is provided with a controller 101, a ROM 102, a memory 103, a storage device 104, a touch panel 105, a scanner 106, a printer 107, and a communicator 108.

The controller 101 is provided with a CPU and controls the entire image processing apparatus 1 in a unified and systematic manner such that users can use standard functions of the image processing apparatus 1, such as copier function, printer function, scanner function, and facsimile function. Upon the image processing apparatus 1 being powered on, the controller 101 allocates memory areas to the respective functions on the memory 103. Upon an optional add-on function being installed, the controller 10 reallocates the memory areas, adjusts the reallocated memory areas depending on the situation, and makes various judgments. This will be later described in detail.

The ROM 102 is a memory that stores operation programs for the controller (also referred to as CPU) 101 and other data.

The memory 103 provides a work area for the CPU. Upon the image processing apparatus being powered on, the controller 101 starts a program by loading it from the ROM 102 onto the memory 103 and allocates memory areas to the respective functions on the memory 103, as described above. The image processing apparatus 1 accepts user operations via the touch panel 105; the image processing apparatus 1 is allowed to accept job input on document image data obtained by the scanner 106 or received by the communicator 108. The memory 103 stores image data transferred from the scanner 106 or the communicator 108.

The storage device 104 is comprised of a hard disk drive (HDD), for example. The storage device 104 stores a copy of image data transferred from the scanner 106 or the communicator 108 then stored on the memory 103.

The operation panel 105 serves for user input for various settings and instructions; the operation panel 105 is provided with a touch-screen liquid-crystal display, for example, that essentially displays messages and operation screens.

The scanner 106 serves as a job input device that reads a document image on a sheet of paper put on a platen (not shown in this figure) and document images on sheets of paper sequentially conveyed by an automatic document feeder (not shown in this figure) referred to as ADF, to convert them into an image file format.

The printer 107 serves as a job output device that prints document image data obtained by the scanner 106, print data received from user terminals, and other data in a specified print mode.

The communicator 108 transmits and receives data by controlling communication with external apparatuses on the network, such as other image processing apparatuses and user terminals. The communicator 108 serves as a job input device that receives jobs from user terminals and other external apparatuses to input them to the image processing apparatus 1 and also serves as a job output device that transmits image data and other data to external apparatuses.

Figure 2:
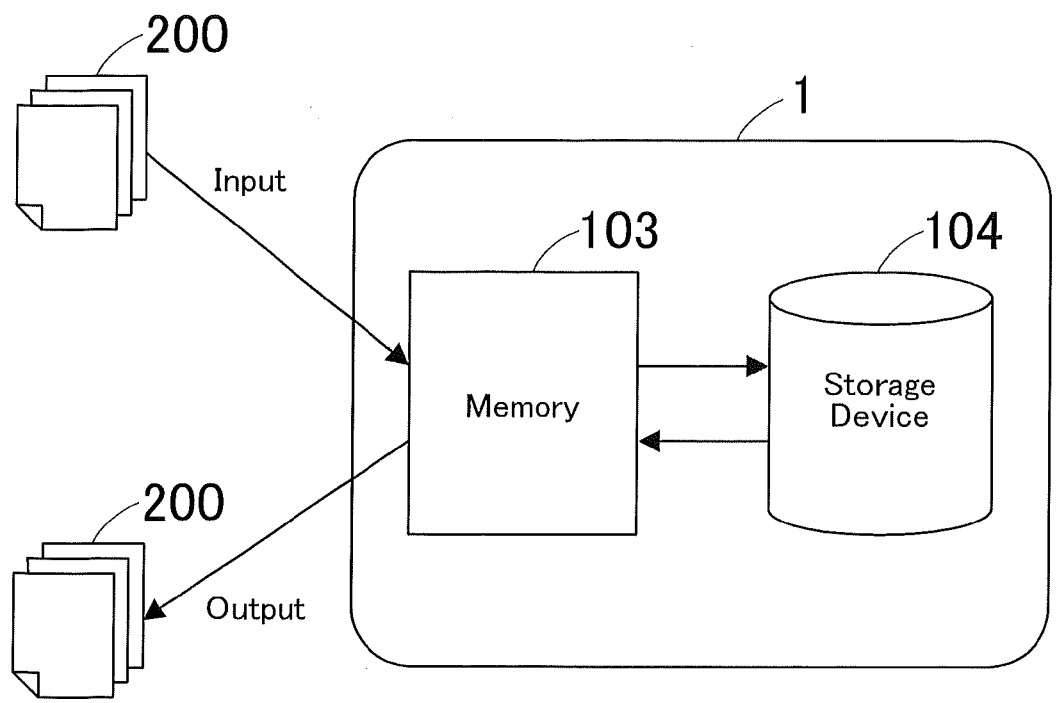
FIG. 2 is a view to explain the input and output operations of image data.

As illustrated in FIG. 2, document image data 200 is input to the image processing apparatus 1 of FIG. 1 by the scanner 106 or the communicator 108. Image data is transferred to the memory 103 then stored on the storage device 104.

If the image data is stored on the memory 103, it is output in a direct manner. If the image data is not stored on the memory 103, it is loaded into the memory 103 from the storage device 104, then output.

As described above, the image processing apparatus 1 is allowed to store a job on document image data obtained by the scanner 106 or received by the communicator 108. The image processing apparatus 1 is also allowed to execute job output by printing or transmitting the document image data.

After job input, job output may be suspended for any cause while it is in progress; the image processing apparatus 1 is allowed to start job output all over again by reading the image data out of the storage device 104.

Figures 3A, 3B:
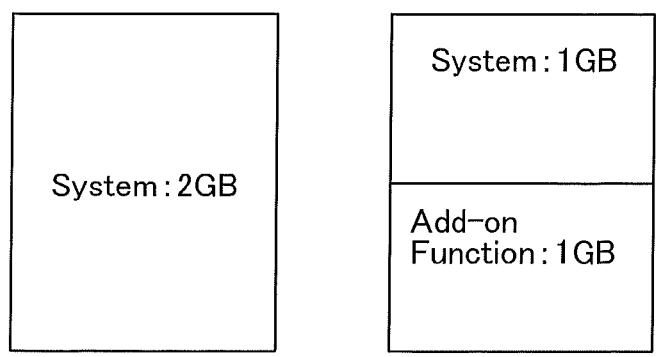
FIG. 3A illustrates allocated memory areas when the image processing apparatus has only standard functions.
FIG. 3B illustrates allocated memory areas when an add-on function (optional function) is installed in addition to the standard functions.

FIGS. 3A and 3B are views to explain allocated memory areas on the memory 103.

FIG. 3A illustrates allocated memory areas when the image processing apparatus 1 has only standard functions. In this example, 2 gigabytes (GB) of memory area is allocated to basic operations caused by the standard functions of the image processing apparatus 1 and this is referred to as a memory area for the system (as indicated as "system" in FIG. 3A).

FIG. 3B illustrates allocated memory areas when an add-on function (optional function) is installed in addition to the standard functions. One GB of memory area is allocated to the add-on function, causing 1 GB of memory area for the system; the memory area for the basic operations is smaller than that of FIG. 3A.

The add-on function may be a panel customization function that allows users to customize the display on the operation panel 105, a server function that allows the image processing apparatus 1 to work as a server, an authentication function that allows the image processing apparatus 1 to work as an authentication apparatus, an enhanced log function that allows the image processing apparatus 1 to store detailed log information, and a sound and video guidance function, for example.

Specifically, in FIG. 3B, the memory area for the system is a half of that of FIG. 3A; the memory area for image input and output and image-related conversion is smaller than those of FIG. 3A. This makes the image processing apparatus 1 unable to use functions that require much memory area. The following are image-related conversion functions, for example.

(1) High resolution conversion: this function uses much memory area because a high-resolution image is large in data size.

(2) Color conversion on large-size document data: this function uses much memory area because data to be converted and converted data both need to be loaded into the memory 103.

(3) File format conversion: this function uses much memory area after scanning and analyzing all the data.

(4) Image consolidation: this function uses much memory area because image data, other image data, and consolidated image data of the foregoing need to be loaded into the memory 103.

In this embodiment, the above-mentioned functions are unavailable during normal operations and will be available by reallocating or adjusting the memory areas. For example, the image-related conversion functions will be available by diverting a part of the memory area for image input to image-related conversion. When large-size image data having many pages, for example, is subjected to image-related conversion, input of another job is restricted in order to ensure as much memory area for image input as possible.

Similarly, in such a case, the image-related conversion functions can be available by diverting a part of the memory area for image input and output to image-related conversion and by switching image data transfer between the memory 103 and the storage device 104 from page by page to band by band. Since image data transfer between the memory 103 and the storage device 104 occur many times, it will take longer than it is during normal operation to finish data transfer, causing the speed performance poor. Furthermore, the life of the storage device 104 will be negatively affected by many accesses. To solve these problems, input of another job is restricted.

FIGS. 4A to 4C are views to explain where image data goes when a document is scanned by the scanner 106, when the obtained image data is converted to a particular file format, and when it is output.

FIG. 4A illustrates the case when the image processing apparatus 1 is in normal operation. A document image is read by the scanner 106. The obtained image data is transferred to the memory 103, by way of an application specific integrated circuit (ASIC) for image input, then loaded into the memory 103. The image data is loaded page by page into the memory 103 and then stored on the storage device 104.

After being loaded into the memory 103 from the storage device 104 and converted into an image file format, the image file is then output by the communicator 108.

If an add-on function is installed on the image processing apparatus 1, the memory area for the system is diverted to the add-on function and, depending on the file format, file format conversion is unavailable because of insufficient memory area for image output.

FIG. 4B illustrates the case when a part of the memory area for image data loading is diverted to file conversion. Since the memory area for image data loading is small during file conversion, input of another job having document image data compressed at a low compression rate or large-size document image data may be restricted during file conversion.

FIG. 4C illustrates the case when image data is loaded into the memory 103 in a different method. In this example, one page of image data is stored on an ASIC 109 for image input and the one page of image data is loaded into the memory 103 band by band. Here, the memory area for image data loading is smaller than it is when the image data is loaded into the memory 103 page by page. So, there is no problem with diverting a part of the memory area for image data loading to file conversion. Meanwhile, as described above, since image data is transferred between the ASIC 109 and the memory 103 and between the memory 103 and the storage device 104 band by band, image data transfer occurs many times, causing the document scanning speed performance poor. Furthermore, the life of the storage device 104 will be negatively affected by many accesses.

Figure 5:
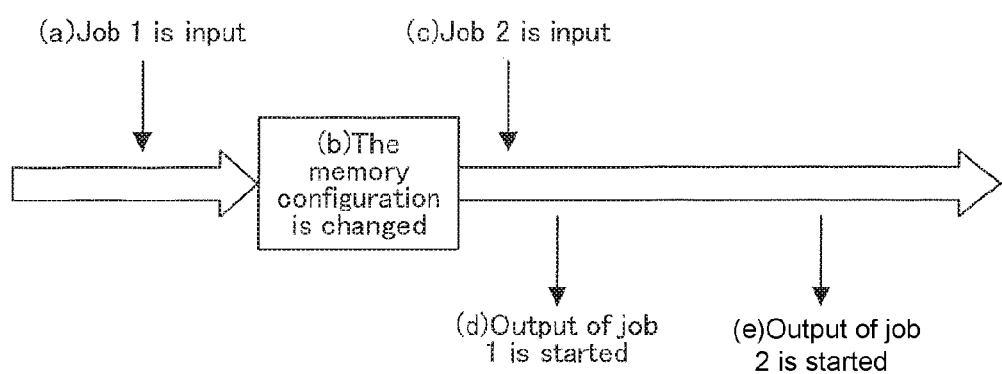
FIG. 5 is a view to explain the operations of the image processing apparatus illustrated in FIG. 1.

FIG. 5 is a view to explain the operations of the image processing apparatus 1 illustrated in FIG. 1.

A job 1 is input at the time indicated by an arrow (a). Image data of the job 1 will be output after being stored on the storage device 104. In this example, an add-on function is installed and the memory areas on the memory 103 (hereinafter memory areas will also be referred to as "memory configuration") are reallocated at the time indicated by an arrow (b) before output of the job 1. After the memory configuration is changed, one or more of the functions of the image processing apparatus 1 are unavailable.

Subsequently, a job 2 is input at the time indicated by an arrow (c) and output of the job 1 is started at the time indicated by an arrow (d). Prior to the start of job output, it is judged whether or not the job (1) is a job input before the memory configuration is changed and, if it is judged that it is a job input before the memory configuration is changed, it is then judged whether or not output of the job (1) requires any function that is unavailable because of the current memory configuration. If it is judged that output of the job 1 requires any unavailable function, it is further judged whether or not the unavailable function will be available by restricting operations related to another job than the job 1 and by adjusting the memory configuration on the memory 103.

If it is judged that the unavailable function will be available by restricting operations related to another job and by adjusting the memory configuration, operations related to another job are restricted and the memory configuration is adjusted. After that, the job 1 is output.

Meanwhile, output of the job 2 is started at the time indicated by an arrow (e). The job 2 is a job input after the memory configuration is changed, which means that the job 2 requires only available functions with the current memory configuration. Thus, without the judgment process, the job 2 is output.

Specific Example 1

A user inputs a data storage job to the image processing apparatus 1 having a standard functional configuration, to store document image data in a box, i.e., a storage area. The user gives an instruction for storing image data in full-color with a resolution of up to 600 dpi (maximum) in Office Word file format so that he/she can use it later as a reference material.

Unless the memory configuration was changed, the user has a choice of outputting the image data from the box in the same color with the same resolution and in the same file format.

In this example, the panel customization function is installed as an add-on function after the image data is stored on the box, in order to avoid misaddressing. The operation panel 105 displays an operation screen on which various settings keys are laid out by default. By the panel customization function, the user can customize the settings keys on the operation screen.

Figure 6:
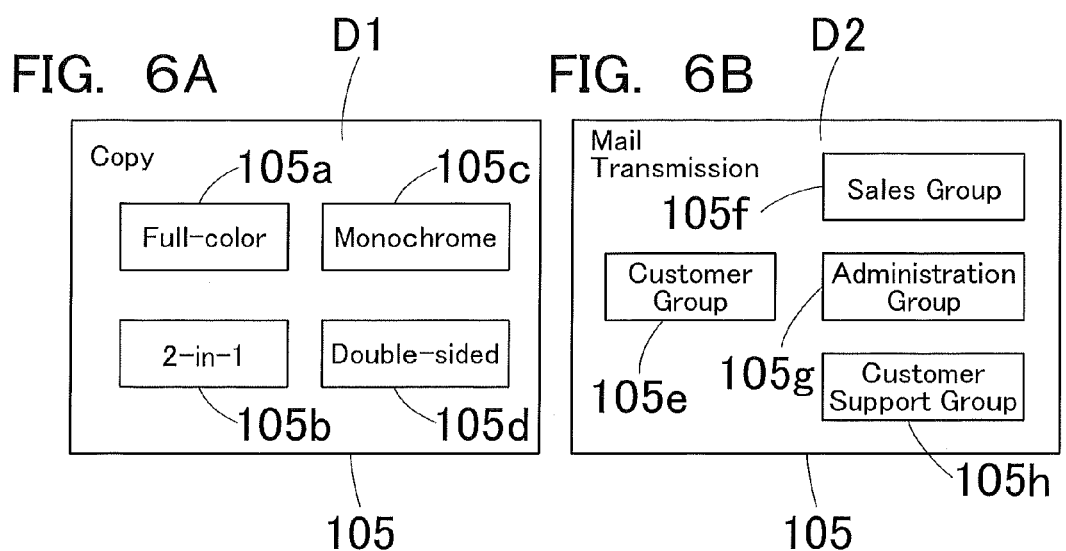
FIGS. 6A and 6B each illustrates an example of an operation screen to be created by a panel customizing function that is an add-on function.

For example, as illustrated in FIG. 6A, the user can lay out settings keys 105c to 105d that are used frequently on a copy screen D1 and this is user-friendly. As illustrated in FIG. 6B, the user also can lay out address group keys on a mail transmission screen D2. With a customer group key 105e that is a group of outsiders, a sales group key 105f, an administration group key 105g, a customer support group key 105h, and other groups of insiders, the user can select preferred addresses by simple operation and avoid selecting a wrong address.

As described above, upon an add-on function being installed, the memory configuration on the memory 103 is changed thus a part of the memory areas for the standard functions is diverted to the add-on function, causing a reduction in the size of the memory areas for the standard functions. Without the presence of an add-on function, the image data would be read out of the box with the same file settings as those when it was stored on the box. In contrast, after an add-on function is installed and the memory configuration is changed, the image data will not be read out of the box with the same file settings.

For example, if job output with a resolution of 600 dpi and Office Word file format are unacceptable, it is judged these function are unavailable at the time of job output. In other words, the high-resolution image data is large in size and will require a large memory area for data loading and file conversion. Thus it is judged these functions are unavailable because of insufficient memory area.

The storage device 104 stores the job to be output. The judgment whether or not output of the job requires any unavailable function is made with reference to a function availability table of FIG. 7 which is stored on a recording medium such as the storage device 104. The function availability table contains available and unavailable functions depending on the size of memory area on the memory 103. With reference to the function availability table, the controller (CPU) 101 of the image processing apparatus 1 judges the upper limits on resolution, document size, output size, and output resolution and availabilities of file formats, banner printing, and image consolidation.

As described above, with reference to the function availability table, which contains available and unavailable functions depending on the size of memory area, it can be precisely judged whether or not output of the job requires any unavailable function.

The function availability table of FIG. 7 contains a restriction on the availability of each function with 1 GB of memory area, as described below. Document scan by the scanner 106 is restricted to a resolution of up to 300 dpi and A3 size or smaller. Job output is restricted to A3 size or smaller and a resolution of up to 600 dpi. DOCX and XLSX file formats are unavailable; banner printing is unavailable; image consolidation is unavailable. With 3 GB of memory area, all functions are available with no restriction. In contrast, some functions are unavailable with 1 GB of memory area and with 2 GB of memory area.

It should be noted that, before it is judged whether or not output of the job requires any unavailable function, it must be judged that the memory configuration was changed after job input. Unless the memory configuration was changed, the functions, which were available at the time of job input, must continuously be available.

It should be noted that information on the memory configuration used at the time of job input must be stored while being associated with the job to be output. By comparing the information and the current memory configuration, it is judged whether or not the memory configuration was changed after job input.

Next, it is further judged whether or not the unavailable functions, i.e., a resolution of 600 dpi and Office Word file format, are available by restricting operations related to another job than the job and by adjusting the memory configuration.

This judgment is made with reference to an operation restriction table of FIG. 8 which is stored on a recording medium such as the storage device 104. The operation restriction table of FIG. 8 contains, depending on the size of memory area, unavailable functions and operation restrictions on another job which make the unavailable functions available.

For example, the following are the operation restrictions with 1 GB of memory area. Document scan with a resolution of 600 dpi will be acceptable by restricting operations related to another job, e.g., by prohibiting operations related to another job. Document scan in SRA3 size will be acceptable by restricting another job to a compression ratio of 2 to 1 or less, A4 size or smaller, and 20 or less pages; job output in A3 size will be available by prohibiting output of another job in SRA3 size or larger. Job output with a resolution of up to 600 dpi will be acceptable by prohibiting output of another job with a resolution of 1200 dpi. File format will be available with no restriction by prohibiting execution of another job. Image consolidation will be available with no restriction by restricting the number of other jobs to be executed in parallel with the job, to 1. Meanwhile, banner printing will continuously be unavailable even by restricting operations related to another job.

As described above, in this embodiment, the operation restriction table contains, depending on the size of memory area, unavailable functions and operation restrictions on another job which make the unavailable functions available. With reference to the operation restriction table, it can be precisely judged whether or not the unavailable function will be available by restricting operations related to another job.

The unavailable function also can be available by adjusting the memory configuration, i.e., by reducing (or extending) the memory areas to a certain size, although this is omitted from FIG. 8. The user may configure the availability of the functions with the operation restriction table of FIG. 8 containing unavailable functions and operation restrictions on another job which make the unavailable functions available. In this case, by searching the table for the available function, it is judged whether or not the unavailable function will be available.

Referring to the function availability table, job output with a resolution of 600 dpi in Office Word file format will be acceptable by restricting operations related to another job than the job, e.g., by prohibiting input and output of another job. The memory configuration is determined in preparation for implementing operation restrictions.

The image processing apparatus 1 implements operation restrictions and adjusts the memory configuration to the memory 103. For example, the memory area for image input is reduced and image data transfer from the memory 103 to the storage device 104 is switched to band by band from page by page. Furthermore, the memory area for resolution conversion and file format conversion is extended such that a resolution of 600 dpi and Office Word file format can be available.

The image processing apparatus 1 is allowed to execute output of the job with this memory configuration. Until completion of job output, the restrictions on the operations related to another job than the job are effective; in this period, another job that is not in compliance with the restrictions is not executed. If necessary, a job start key on the operation panel 105 or on an operation screen of an external apparatus on the network is disabled such that the user cannot start another job with the key.

Upon completion of job output, the image processing apparatus 1 releases the operation restrictions and restores the memory configuration to the state as it was before operation restriction.

Specific Example 2

A user inputs a file transmission job to the image processing apparatus 1 having a standard functional configuration. The user gives an instruction for transmitting image data in SRA3 (320 mm×450 mm) size with a resolution of 300 dpi in grayscale and PDF file format. Image data obtained by document scan is stored on the storage device 104. After that, network shutdown occurs during data transfer and the job is kept stored thereon as a suspended job (a job to be output). After job input but before job resumption due to network recovery, an add-on function is installed and the memory configuration on the memory 103 is changed.

When the job is resumed with network recovery, it is judged whether or not it is a job input before the memory configuration is changed; in this example, it is judged that it is a job input before the memory configuration is changed.

Referring to the function availability table, it is judged job output in SRA3 size and grayscale is not acceptable. In other words, the image data is large in size and will require a large memory area for loading of the image data before and after color conversion, so it is judged these functions are unavailable because of insufficient memory area.

Next, it is further judged whether or not the unavailable functions will be available (job output in SRA3 size and grayscale will be acceptable) by restricting operations related to another job than the job and by adjusting the memory configuration. This judgment is made with reference to the function availability table.

For example, job output in SRA3 size and grayscale will be acceptable by restricting operations related to another job to a compression ratio of 2 to 1 or less, A4 size or smaller, and 20 or less pages. The memory configuration is determined in preparation for implementing operation restrictions.

The image processing apparatus 1 implements operation restrictions and adjusts the memory configuration to the memory 103. In order to execute job output in SRA3 size and grayscale, for example, it reduces the memory area for image input and extends the memory area for data loading and color conversion.

The image processing apparatus 1 is allowed to execute output of the job with this memory configuration. Until completion of job output, the restrictions on the operations related to another job are effective. That is, if another job is not in compliance with the restrictions, it is discarded or a job start key on the operation panel 105 or on an external apparatus on the network is disabled. For example, if the compression ratio is not in compliance with the restriction, another job is discarded; if the size of the image data or a specified size for the image data is not compliance with the restriction, a manipulation portion of the image processing apparatus 1 or an external apparatus is disabled; if the number of pages in the image data is not compliance with the restriction, another job is discarded.

Upon completion of job output, the image processing apparatus 1 releases the operation restrictions and restores the memory configuration to the state as it was before operation restriction.

Specific Example 3

A user inputs a timer facsimile transmission job to the image processing apparatus 1 having a standard functional configuration. The user gives an instruction for transmitting consolidated image data of document image data and registered image data, in A4 size. Image data obtained by the scanner 106 is stored on the storage device 104; after job input but before transmission time, an add-on function is installed and the memory configuration on the memory 103 is changed.

At the transmission time, it is judged whether or not it is a job input before the memory configuration is changed; in this example, it is judged that it is a job input before the memory configuration is changed.

Referring to the function availability table, image consolidation is unavailable. In other words, document image data, registered image data, and consolidated image data of the foregoing will require a large memory area for data loading. Thus this function is unavailable because of insufficient memory area.

Next, it is further judged whether or not the unavailable function, image consolidation, will be available by restricting operations related to another job than the job and by adjusting the memory configuration. This judgment is made with reference to the function availability table.

In this example, image consolidation will be available by restricting the number of other jobs to be executed in parallel with the job, to 1. The memory configuration is determined in preparation for implementing operation restrictions.

The image processing apparatus 1 implements operation restrictions and, by adjusting the memory configuration on the memory 103, extends the memory area for image consolidation.

The image processing apparatus 1 is allowed to execute output of the job with this memory configuration. Until completion of job output, the number of other jobs to be executed in parallel with the job is restricted to 1. While one other job in progress, a job start key on the operation panel 105 or on external apparatus on the network is disabled.

Specific Example 4

A user inputs a banner print job (297 mm×1200 mm) to the image processing apparatus 1 having a standard functional configuration, by operating a personal computer. Image data received from the personal computer is stored on the storage device 104. Without paper in the specified size, the job is kept stored thereon as a suspended job. After job input but before loading paper, an add-on function is installed and the memory configuration on the memory 103 is changed.

When the suspended job is detected, it is judged whether or not it is a job input before the memory configuration is changed; in this example, it is judged that it is a job input before the memory configuration is changed.

Referring to the function availability table, banner print is unavailable. In other words, a banner image will require a large memory area for data loading and banner print is unavailable because of insufficient memory area.

Next, it is further judged whether or not the unavailable function, banner print, will be available by restricting operations related to another job than the job and by adjusting the memory configuration. This judgment is made with reference to the function availability table.

The suspended job is discarded if it is judged that banner print will be unavailable even by restricting operations related to another job. In this case, a message stating that banner print is unavailable with the current memory configuration is displayed on the operation panel 105 or an operation screen of the personal computer on the network.

Figure 9:
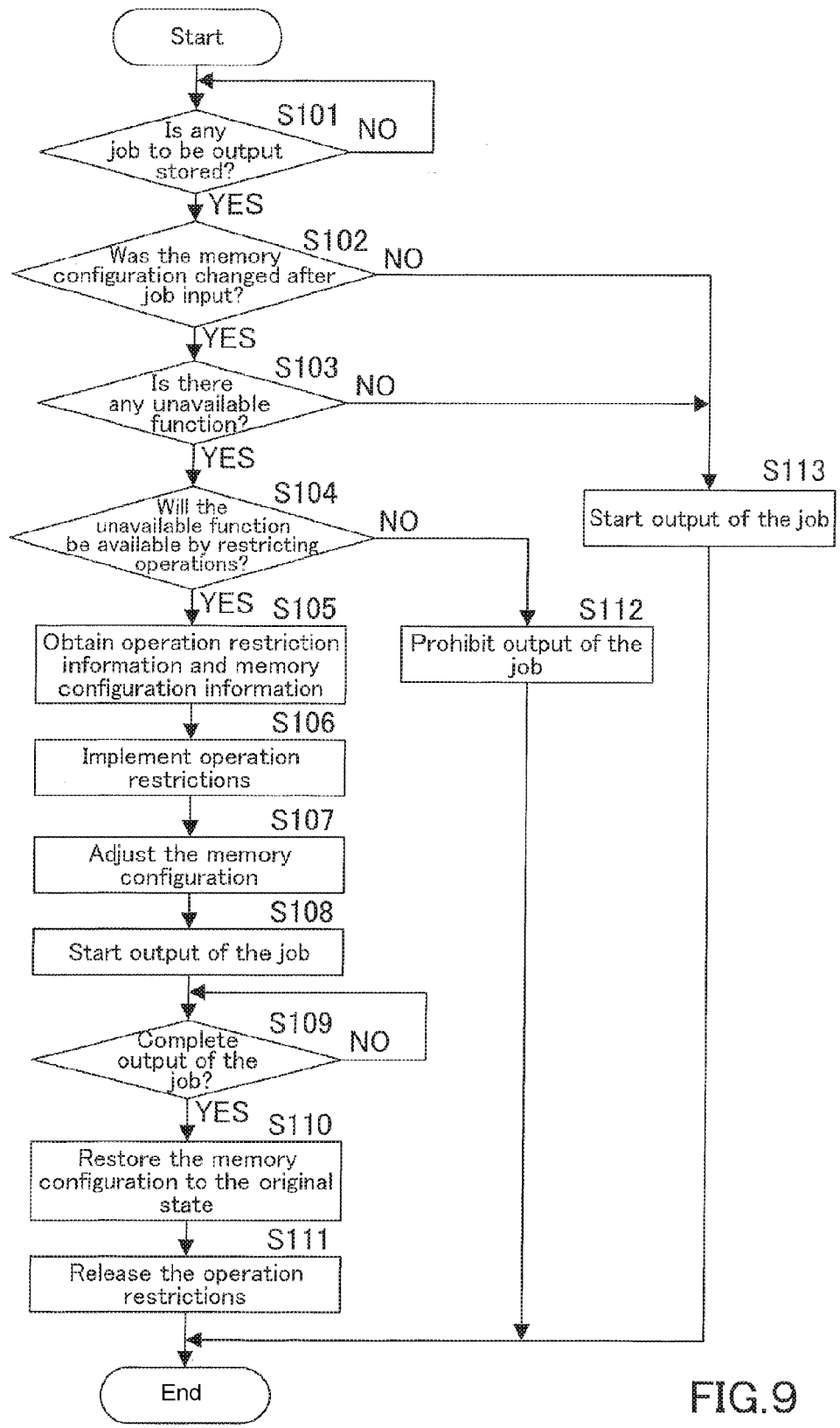
FIG. 9 is a flowchart representing the operations of the image processing apparatus.

FIG. 9 is a flowchart representing the operations of the image processing apparatus 1. The flowchart is executed by the controller (CPU) 101 of the image processing apparatus 1 in accordance with an operation program stored on a recording medium such as the ROM 102.

In Step S101, it is judged whether or not any job to be output is stored. If no job to be output is stored (NO in Step S101), the flowcharts waits until a job to be output is stored. If any job to be output is stored (YES in Step S101), then it is judged in Step S102 whether or not the memory configuration was changed after job input. If the memory configuration was not changed after job input (NO in Step S102), this means that output of the job has been acceptable since job input. Output of the job is thus started in Step S113.

If the memory configuration was changed after job input (YES in Step S102), it is further judged in Step S103 whether or not output of the job requires any unavailable function. If that requires no unavailable function (No in Step S103), the flowchart proceeds directly to Step S113 in which output of the job is started. If that requires any unavailable function (YES in Step S103), the flowchart proceeds to Step S104.

In Step S104, if it is further judged whether or not the unavailable function will be available by restricting operations related to another job than the job and by adjusting the memory configuration on the memory 103.

If the unavailable function will not be available even by restricting operations related to another job and even by adjusting the memory configuration (NO in Step S104), this means that output of the job is unacceptable. The job is thus discarded from the storage device 104 in Step S112. Discarding the job brings a solution to the inconvenience caused by the job being kept stored on the storage device 104, allowing effective use of the limited memory resources on the storage device 104.

If the unavailable function will be available by restricting operations related to another job and by adjusting the memory configuration (YES in Step S104), operation restriction information and memory configuration information are obtained in Step S105. In Step S106, operation restrictions are implemented; the memory configuration is then adjusted in Step S107.

In Step S108, output of the job is started; it is then judged in Step S109 whether or not output of the job is completed. If output of the job is not completed (NO in Step S109), the flowchart waits until it is finished. If output of the job is completed (YES in Step S109), the memory configuration is restored to the state as it was before adjustment in Step S110 and the operation restrictions are released in Step S111.

Figure 10:
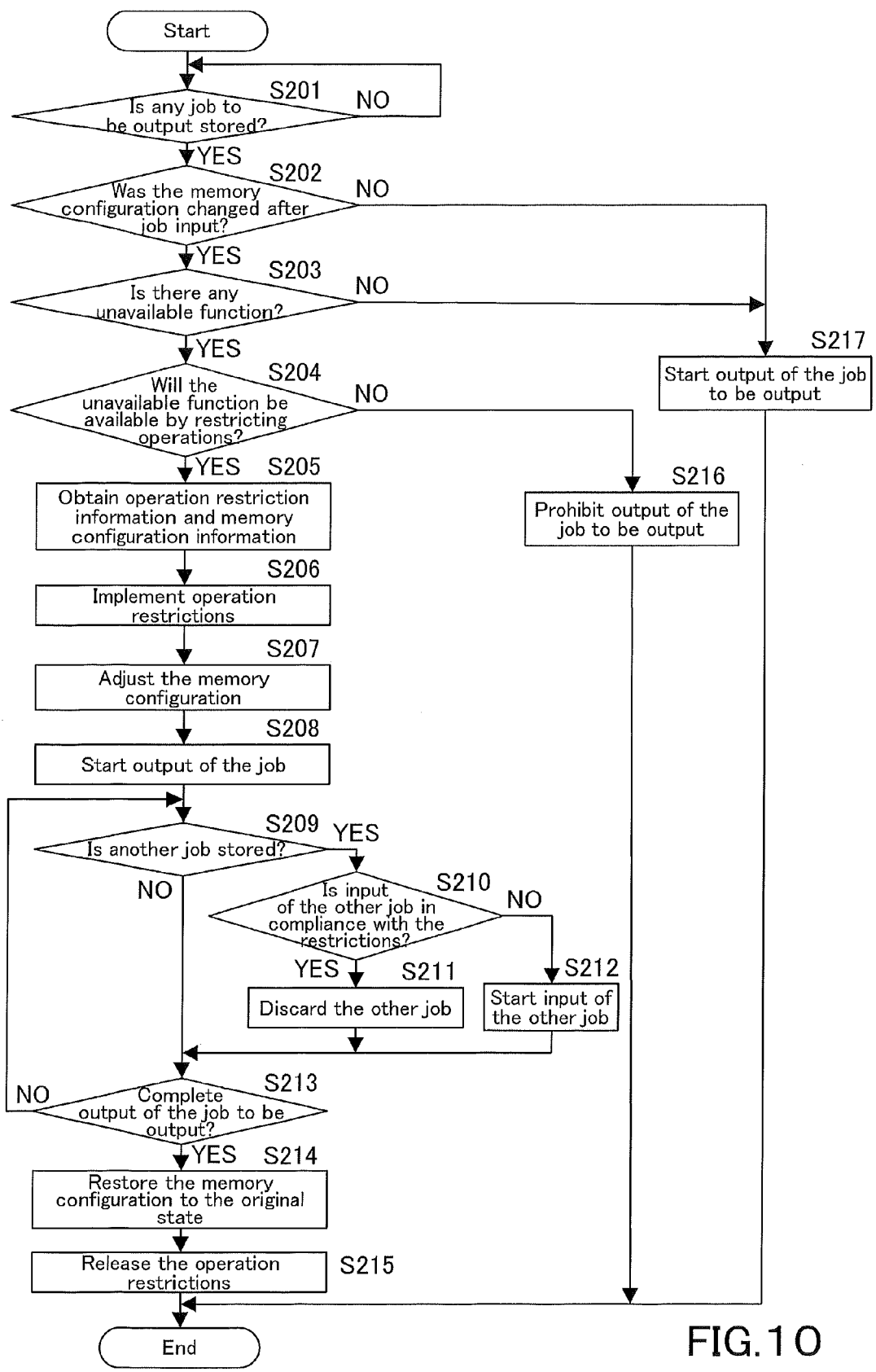
FIG. 10 is another example of a flowchart representing the operations of the image processing apparatus.

FIG. 10 is another example of a flowchart representing the operations of the image processing apparatus 1. Similarly, the flowchart is executed by the controller (CPU) 101 of the image processing apparatus 1 in accordance with an operation program stored on a recording medium such as the ROM 102.

In Step S201, it is judged whether or not any job to be output is stored. If no job to be output is stored (NO in Step S201), the flowcharts waits until a job to be output is stored. If any job to be output is stored (YES in Step S201), then it is judged in Step S202 whether or not the memory configuration was changed after job input. If the memory configuration was not changed after job input (NO in Step S202), this means that output of the job has been acceptable since job input. Output of the job is thus started in Step S217.

If the memory configuration was changed after job input (YES in Step S202), it is further judged in Step S203 whether or not output of the job requires any unavailable function. If that requires no unavailable function (No in Step S203), the flowchart proceeds directly to Step S217 in which output of the job is started. If that requires any unavailable function (YES in Step S203), the flowchart proceeds to Step S204.

In Step S204, if it is further judged whether or not the unavailable function will be available by restricting operations related to another job than the job and by adjusting the memory configuration on the memory 103.

If the unavailable function will not be available even by restricting operations related to another job and even by adjusting the memory configuration (NO in Step S204), this means that output of the job is unacceptable. The job is thus discarded from the storage device 104 in Step S216.

If the unavailable function will be available by restricting operations related to another job, e.g., by prohibiting input of another job, and by adjusting the memory configuration (YES in Step S204), operation restriction information and memory configuration information are obtained in Step S205. In Step S206, operation restrictions are implemented; the memory configuration is then adjusted in Step S207.

In Step S208, output of the job is started; it is then judged in Step S209 whether or not another job is stored. If no other job is stored (NO in Step S209), the flowchart proceeds to Step S213. If another job is stored (YES in Step S209), it is further judged in Step S210 whether or not the other job is compliance with the restrictions on input. For example, the restrictions on input are a compression ratio of 2 to 1 or less, A4 size or smaller, and 20 or less pages.

If it is in compliance with the restrictions (YES in Step S210), the flowchart proceeds to Step S211 in which the other job is discarded or a job start key on the operation panel 105 or on an operation screen of an external apparatus on the network is disabled such that the user cannot start the other job with the key. After that, the flowchart proceeds to Step S213. If it is not in compliance with the restrictions (NO in Step S210), input of the other job is started in Step S212. The flowchart then proceeds to Step S213.

In Step S213, it is judged whether or not output of the job to be output is completed. If it is not completed (NO in Step S213), the flowchart returns to Step S209. If output of the job to be output is completed (YES in Step S213), the memory configuration is restored to the state as it was before adjustment in Step S214 and the operation restrictions are released in Step S215.

As described above, in this embodiment, functions required by the job can be ensured by restricting operations related to another job and by adjusting the memory areas. Job output is executed by the ensured functions, not by alternative functions to unavailable functions, even with the changed memory configuration due to an optional function being installed. For example, when the user gives an instruction for high resolution output, job output with a high resolution is executed as intended by the user. This brings a solution to the inconvenience caused by the job being kept stored on the storage device 104, allowing effective use of the limited memory resources on the storage device 104. The solution works most effectively if output of the job requires an image-related conversion function using a large memory area.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus having functions installed thereon, the image processing apparatus includes:
   a job input portion that inputs a first job;
   a job storage that stores the first job input by the job input portion;
   a job output portion that outputs the first job stored on the job storage;
   a memory that allows allocating memory areas to the functions installed on the image processing apparatus and reallocating the memory areas;
   a first judgment portion that judges whether or not the memory areas were reallocated after the job input portion inputs the first job but before the job output portion outputs the first job stored on the job storage;
   a second judgment portion that judges whether or not output of the first job requires any unavailable function, after the first judgment portion judges that the memory areas were reallocated after input of the first job but before output of the first job;
   a third judgment portion that judges whether or not the unavailable function will be available by restricting operations related to a second job and by adjusting the memory areas, after the second judgment portion judges that output of the first job requires any unavailable function; and
   an operation restriction portion restricts operations related to the second job and adjusts the memory areas, after the third judgment portion judges that the unavailable function will be available by restricting operations related to the second job and by adjusting the memory areas,
   wherein the job output portion outputs the first job while the operation restriction portion keeps restrictions on the operations related to the second job.

2. The image processing apparatus as recited in claim 1, wherein output of the first job requires an image-related conversion function.

3. The image processing apparatus as recited in claim 1, wherein the operation restriction portion restricts operations related to the second job by prohibiting input or output of the second job.

4. The image processing apparatus as recited in claim 3, wherein, when a number of second jobs is not in compliance with a restriction for being executed in parallel with the first job, the operation restriction portion prohibits input or output of the second job.

5. The image processing apparatus as recited in claim 4, wherein, when the number of the second jobs is not in compliance with a restriction for being executed in parallel with the first job, the operation restriction portion disables a manipulation portion of the image processing apparatus or an external apparatus, the manipulation portion allowing a user to give an instruction for executing the second job.

6. The image processing apparatus as recited in claim 3, wherein, when at least one of a compression ratio, a size, and number of pages of image data of the second job is not in compliance with a restriction for being input, the operation restriction portion prohibits input of the second job.

7. The image processing apparatus as recited in claim 6, wherein, when a compression ratio of the image data is not in compliance with a restriction for being input, the operation restriction portion discards the second job.

8. The image processing apparatus as recited in claim 6, wherein, when the size of the image data is not in compliance with a restriction for being input or when the image data is set to a size not being compliance with a restriction for being input, the operation restriction portion disables a manipulation portion of the image processing apparatus or an external apparatus, the manipulation portion allowing a user to give an instruction for executing the second job.

9. The image processing apparatus as recited in claim 6, wherein, when the number of pages of the image data is not in compliance with a restriction for being input, the operation restriction portion discards the second job.

10. The image processing apparatus as recited in claim 1, wherein the operation restriction portion adjusts the memory areas by extending a memory area for output of the first job and by reducing a memory area for execution of the second job.

11. The image processing apparatus as recited in claim 1, further comprising a first table storage that stores a first table containing available and unavailable functions depending on a size of a memory area, wherein, with reference to the first table stored on the first table storage, the second judgment portion judges whether or not output of the first job requires any unavailable function.

12. The image processing apparatus as recited in claim 1, further comprising a second table storage that stores a second table containing, depending on a size of memory area, unavailable functions and restrictions on operations related to the second job, the restrictions to make the unavailable functions available, wherein, with reference to the second table stored on the second table storage, the third judgment portion judges whether or not the unavailable functions will be available by restricting the operations related to the second job.

13. The image processing apparatus as recited in claim 12, wherein a user can configure the availability of the functions with the second table, the second table containing, depending on the size of memory area, unavailable functions and restrictions on the operations related to the second job, the restrictions to make the unavailable functions available.

14. The image processing apparatus as recited in claim 1, further comprising a job discarding portion that discards the first job after the third judgment portion judges that the unavailable function will not be available even by restricting operations related to the second job and by adjusting the memory areas.

15. The image processing apparatus as recited in claim 1, further comprising the operation restriction portion adjusts the memory areas by switching transfer of image data of the second job from page by page to band by band.

16. An image processing method to be implemented by an image processing apparatus having functions installed thereon, the image processing method comprising:
   inputting a first job;
   storing the first job on a job storage, the first job being input;
   outputting the first job stored on the job storage;
   allocating memory areas to the functions installed on the image processing apparatus and reallocating the memory areas;
   judging whether or not the memory areas were reallocated after input of the first job but before output of the first job stored on the job storage;
   judging whether or not output of the first job requires any unavailable function, after it is judged that the memory areas were reallocated after input of the first job but before output of the first job;

judging whether or not the unavailable function will be available by restricting operations related to a second job and by adjusting the memory areas, after it is judged that output of the first job requires any unavailable function; and restricting operations related to the second job and adjusting the memory areas, after it is judged that the unavailable function will be available by restricting operations related to the second job and by adjusting the memory areas, wherein the first job is output while restrictions on the operations related to the second job are effective.

17. A non-transitory computer-readable recording medium storing an image processing program for a computer of an image processing apparatus having functions installed thereon, the image processing program to make the computer execute:

inputting a first job;

storing the first job on a job storage, the first job being input;

outputting the first job stored on the job storage;

allocating memory areas to the functions installed on the image processing apparatus and reallocating the memory areas;

judging whether or not the memory areas were reallocated after input of the first job but before output of the first job stored on the job storage;

judging whether or not output of the first job requires any unavailable function, after it is judged that the memory areas were reallocated after input of the first job but before output of the first job;

judging whether or not the unavailable function will be available by restricting operations related to a second job and by adjusting the memory areas, after it is judged that output of the first job requires any unavailable function; and restricting the operations related to the second job and adjusting the memory areas, after it is judged that the unavailable function will be available by restricting the operations related to the second job and by adjusting the memory areas, wherein the first job is output while restrictions on the operations related to the second job are effective.

* * * * *